DRYER CONTROL

Filed Jan. 13, 1964

INVENTORS
JOHN E. MAAS
OTTO R. BEHRENS
BY Bayard H. Michael
ATTORNEY

United States Patent Office 3,269,026
Patented August 30, 1966

3,269,026
DRYER CONTROL

John E. Maas, La Grange Park, and Otto R. Behrens, Skokie, Ill., assignors to Controls Company of America, Melrose Park, Ill., a corporation of Delaware Filed Jan. 13, 1964, Ser. No. 337,305
24 Claims (Cl. 34—45)

Figure 1:
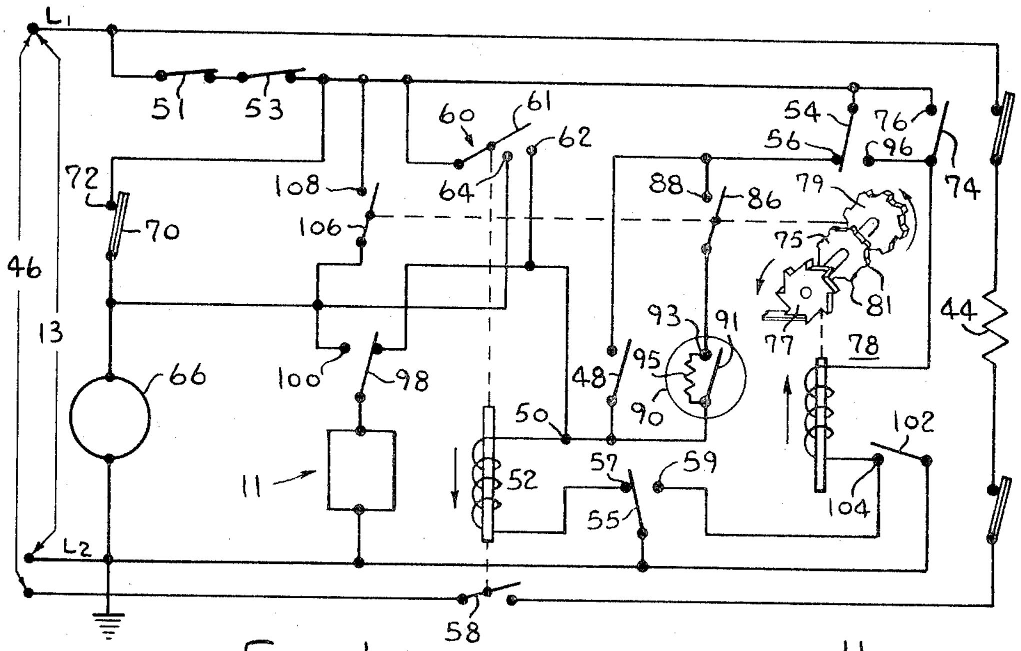

This invention relates to an improvement in dryer controls such as the type which afford control on the basis of direct moisture sensing. More particularly, this invention relates to a control circuit which will provide operation on the basis of direct moisture sensing, a combination of moisture sensing and timing or straight timing and does so with a virtually all electronic control.

Accordingly, a general object of this invention is to provide an improved electronic moisture sensing control.

Another object of this invention is to provide an electronic control which will provide the selectivity of operation normally available from a control incorporating mechanical elements, namely to provide either a direct moisture sensing dryer cycle, a moisture sensing cycle followed by a timed cycle or a straight timed cycle; and, furthermore, to provide for adjustment of the duration of the timed cycle in such a control.

For the achievement of these and other objects, this invention contemplates a control which senses moisture content and controls dryer operation in accordance with sensed moisture content. The control is also adapted to provide a timed cycle at the end of the moisture sensing cycle by switching, after the sensing cycle, to an electronic timing circuit, e.g. an RC network which then assumes control over dryer operation. This circuit has the additional advantage that it can provide a straight timed operation without a direct sensing cycle.

Figure 2:
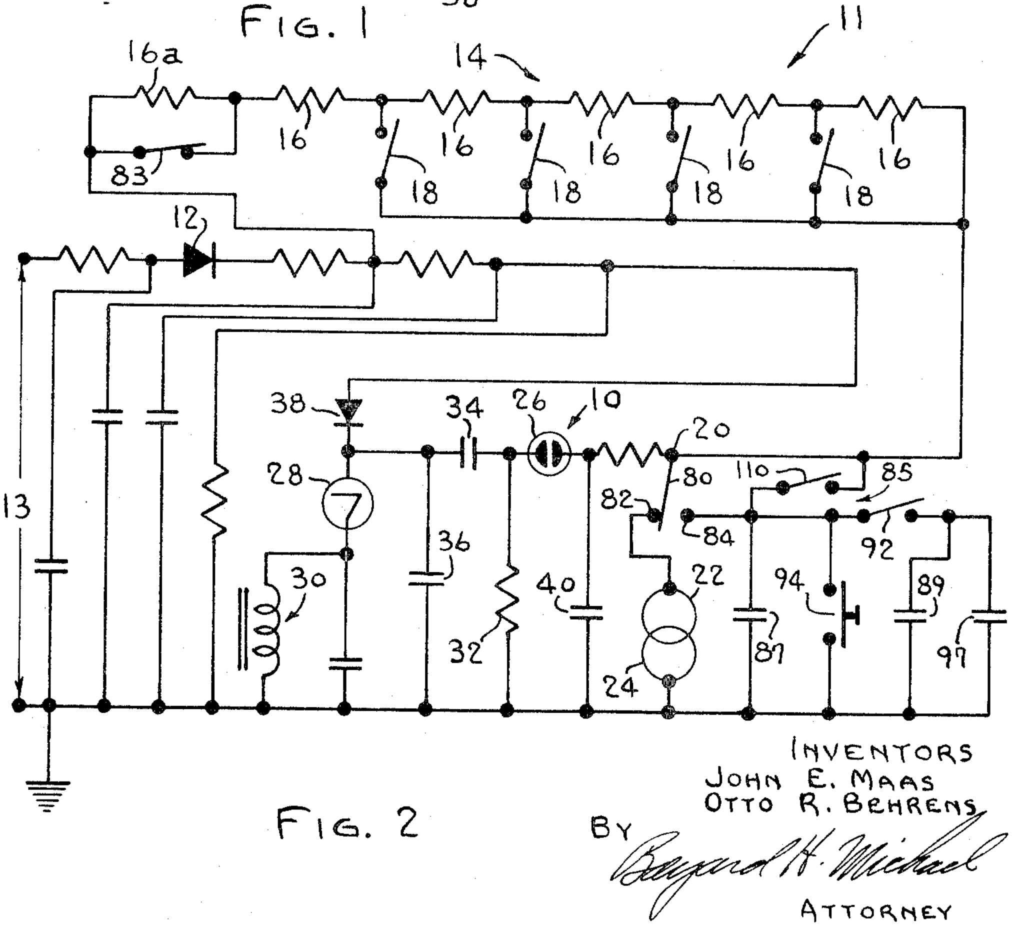

Other objects and advantages will be pointed out in, or be apparent from, the specification and claims, as will obvious modifications of the embodiments shown in the drawings, in which:

FIG. 1 schematically illustrates a portion of the electrical circuit of a dryer in accordance with this invention; and FIG. 2 is a schematic illustration of an electronic control constructed in accordance with this invention.

With particular reference to the drawings, moisture sensing control portion 10 of electronic control 11 of this invention is similar to the control circuit disclosed and claimed in the co-pending application of Otto R. Behrens for a "Control Device," Serial No. 45,329, filed July 26, 1960 and assigned to the assignee of this application. In the preferred embodiment, the electronic control is connected to A.C. source 13 and alternating current from source 13 is rectified by diode 12 as it passes to the electronic control. From diode 12 direct current flows to selector mechanism 14 made up of a plurality of resistance elements 16 arranged for selective connection in the control circuit through actuation of switches 18 so that resistances 16 can be completely eliminated from the circuit or can be switched into the circuit as desired, which, as will appear from the following description, provides a measure of control over the degree of dryness achieved by the control. From the selector switch, current passes to junction 20 and from the junction to a pair of sensing rings, one of the sensing rings 22 being connected to junction 20 so that the direct current is applied thereto and the second sensing ring 24 being connected to the opposite side of the A.C. source or to ground. Sensing rings 22 and 24 are preferably mounted within the rotating drum of a dryer and are arranged to be bridged by the material being dried so that current leaks across the rings to ground in accordance with the moisture content of the articles in the dryer. Neon lamp

26 is electrically connected between junction 20 and a suitable switching device such as four layer diode 28 which is connected in circuit with and controls current flow to control relay 30. More particularly, diode 28 is normally nonconducting, and there is no current flow in the coil of relay 30, but diode 28 is characterized by having a switch-over voltage which, when applied thereto, renders the diode conductive to permit current to flow to relay 30. For most effective operation it is desirable to pulse diode 28 with the switch-over voltage rather than subject the diode to a gradual build-up of voltage and, to this end, neon tube 26 is connected between diode 28 and junction 20 and normally blocks current flow from junction 20 to diode 28. The neon tube itself exhibits a switch-over voltage at which it is rendered conductive and, as the material bridging rings 22 and 24 dries, the potential on junction 20 builds up until it reaches the switch-over voltage of lamp 26, whereupon the lamp fires and applies the necessary pulse to diode 28 to render it conductive and permit current to flow to relay 30 and effect a particular operational function in the dryer. Resistance 32 and capacitors 34 and 36 are included in the circuit to sharpen the pulse transmitted through neon tube 26 to diode 28. Blocking diode 38 insures flow of the pulse from the neon tube to diode 28. Capacitor 40 is connected in circuit between the sensing rings and neon tube 26 to prevent the neon tube from being prematurely broken down due to a relatively small or suspended load in the dryer which could create an artificial condition of a relatively high potential at junction 20 before the material has been dried to a moisture content corresponding to that potential. Capacitor 40 provides a timed delay in the response of the neon lamp so that should this artifically high potential appear at junction 20, a charge is stored on capacitor 40 and the rings will eventually be bridged, within a few revolutions of the drum, by material which, if it hasn't dried sufficiently, will permit the charge on the capacitor to leak off through the sensing rings.

With reference to FIG. 1, the control portion of the dryer circuit is connected across A.C. source 13 whereas heater 44 of the dryer is connected across A.C. source 46, sources 13 and 46 preferably being approximately 115 and 230 volts A.C., respectively. For a moisture sensing dryer cycle, selection is made through a suitable selector mechanism such as turning a control dial (not shown) to a "damp-dry" setting. This selection operates momentary switch 48 which completes a circuit from $L_1$ through door switch 51, on-off switch 53, switch 54, which is normally closed on contact 56, switch 48 and through junction 50 to machine relay 52. Switch 55 is normally closed on contact 57 and completes the circuit for machine relay 52 to lead $L_2$. Switch 55 is controlled by relay 30 which is in turn controlled by the electronic control circuit 11. Actuation of relay 52 closes switch 58 to complete a circuit through and energize heater 44 and also operates switch 60 to close switch blade 61 on contacts 62 and 64. Closure on contact 62 establishes a holding circuit through coil 52 and closure on contact 64 establishes parallel circuits through dryer motor 66 and electronic control 11. Energization of relay 52 thereby activates the dryer heater and dryer motor under control of the electronic control 11. More particularly, dryer operation is under the control of the moisture sensing portion 10 of the electronic control and continues until a desired, predetermined moisture content of the clothing is achieved and sensed, whereupon switching diode 28 is pulsed to its "on" condition, as was described above, and relay 30 is operated. Operation of relay 30 actuates switch 55 out of engagement with contact 57 and, for a purpose to be described hereinafter, into engagement with contact 59 thereby opening the holding circuit through relay 52 to de-energize the relay and open switches 58 and 60 to de-energize the dryer heater and motor and the electronic control. Depending upon the temperature in the dryer, dryer operation will be terminated at this point or, if the temperature within the dryer is high enough, cool-down thermostat 70 closes on contact 72 to complete a circuit through the dryer motor and maintain energization of the dryer motor without application of heat to thereby provide a cool-down cycle. The cool-down thermostat opens at the desired lower temperature to interrupt the circuit to the dryer motor.

The control circuit of this invention is also adapted to provide a moisture sensing dryer cycle followed by a timed dryer cycle. Such operation is particularly advantageous for drying materials such as synthetic "wash-and-wear" fabrics whereby the material can be reduced to a generally uniform moisture content during the moisture sensing cycle and then the dryer put through a straight timed cycle to reduce moisture content to a desired point. More particularly, the selector mechanism (not shown) is operated to select what may be termed a "wash-and-wear" cycle. In making this selection, wash-and-wear switch 74 is closed on contact 76 and switch 48 is momentarily closed to complete a circuit to machine relay 52 and energize the dryer motor and heater and the electronic control in the manner described above. At a predetermined moisture content relay 30 is operated by pulsing switching diode 28, switch 55 opens the circuit through machine relay 52 by moving from contact 57 and closing on contact 59. Upon engagement with contact 59, a circuit is completed to an impulse or stepping relay 78. That is, closure of switch 74 having enabled the circuit to the impulse relay, the circuit to the relay is completed upon closure of switch 55 on contact 59. In the direct sensing or "damp-dry" cycle, switch 74 was open thereby disabling the circuit to relay so that closure on contact 59 was ineffective. Since the impulse relay can be of any suitable, well-known construction, it is only schematically illustrated in FIG. 1 and includes a ratchet drive 77 for stepping a control cam, or cams, 79 which controls the relay switches. Each time the relay is energized the ratchet is moved one step to step the cam correspondingly with the ratchet holding te step until a subsequent pulse is received. Accordingly, when a pulse is received cam 79 steps to close the relay switches which are then held closed until a subsequent pulse is received to step the cam and open the switches.

Switch 55 is constructed so that it is normally closed on contact 57 and so that the closure on switch contact 59 is only momentary to feed a pulse to relay 78. When relay 78 steps it operates impulse relay switch 80 (see FIG. 2) to move its switch blade out of engagement with contact 82 and into engagement with contact 84 thereby removing sensing rings 22 and 24 from the control circuit and connecting electronic timer 85 in the control circuit, as will be described more completely hereinafter. Energization of relay 78 also closes impulse relay switch 86 on contact 88 which, in cooperation with a switch 90, completes a circuit to machine relay 52 to operate the relay and electrically energize the dryer heater and motor and electronic control. Switch 90 is preferably in the form of a normally open fluorescent starter switch having a bimetal switch element 91 associated with an internal heater 95. After a short time delay of approximately four to five seconds, heater 95 causes switch element 91 to close on contact 93 and energize relay 52 which closes switch 61 on contact 62 to maintain energization of relay 52 and by-pass the fluorescent switch, allowing it to open and remain open until a subsequent operation is called for. It will be appreciated that switching constructions other than a fluorescent starter could be used provided they momentarily hold the circuit to the machine relay closed and then open the circuit to permit the machine relay holding circuit to assume control. Machine relay 52 remains energized through switch 60, switch 55 (which reclosed on contact 57 after passing an impulse to relay 78). Dryer operation is again under control of electronic control 11, however, operation of impulse relay switch 80 has removed sensing rings 22 and 24 from the circuit and connected neon tube 26 for control by electronic timer 85. More particularly, capacitor 87 is now connected in circuit and accumulates a charge and during this time neon tube 26 is in a nonconducting state. After a predetermined time delay, the charge on capacitor 87 is sufficient to break down neon lamp 26 and pulse switching diode 28 and energize relay 30. Relay 30 operates switch 55 to close on contact 59 and thereby opening the circuit through machine relay 52 to de-energize the dryer heater and motor and the electronic sensing control, and also to pulse relay 78 to open switch 86 and move switch 80 from contact 84 thereby returning the control circuit to its neutral starting position. Again a cool-down cycle can be provided depending upon the temperature within the dryer at the end of the dryer cycle.

In the electronic timing circuit, resistances 16 cooperate with capacitor 87 in a conventional manner to provide an RC (resistance-capacitance) network for effecting a particular time delay which can be varied by varying the characteristics of the capacitance and resistances as required for a particular application. The time delay available can be increased by adding capacitance and adjustment can be had by providing for selective connection of the capacitance in the circuit. More particularly, capacitors 89 and 97 are arranged for selective connection in the electronic timing circuit by switch 92 and, when connected in circuit, increase the time delay available. Obviously the number of capacitors and their switching into and out of the circuit can be varied as desired. Furthermore, it will be appreciated that the selective connection of resistance 16 in the circuit also provides some degree of adjustment.

Resistance 16*a* is included in the dryer control circuit to provide a time base when impulse relay 78 has switched from direct moisture sensing to electronic timing control. Connection of resistance 16*a* in circuit is controlled by relay switch 83. Switch 83 is normally closed and, upon energization of relay 78 to move switch 80 from contact 82 to 84 to set-up the electronically timed cycle, switch 83 is also opened to connect resistance 16*a* in the RC network with capacitor 87 and provide a desired time base.

A normally open momentary switch 94 is connected in circuit with the capacitors 87, 89 and 97. Switch 94 is connected for control by impulse relay 78. For example, cam 75 can be connected to be driven by ratchet 77 and includes a plurality of nibs 81 arranged to effect momentary closure of switch 94 each time the impulse relay is stepped to close its switches. Switch 94 connects the capacitors to ground to remove any residual charge on the capacitors and insure that the electronic timer begins each cycle from zero.

As was previously discussed in connection with the function of capacitor 40, a small load in the dryer may become suspended and not bridge the sensing rings. In some applications it may be desirable to provide for an additional time delay when a small load is being treated, i.e. in addition to the delay already provided by capacitor 40. A "small-load" switch 110 is controlled by the control dial (not shown) and, when the control dial is moved to select a "small-load" cycle, switch 110 is closed, as is switch 48 to initiate the moisture sensing portion of the operation. During the moisture sensing portion of the operation, capacitor 87 is included in circuit with the sensing rings along with capacitor 40 to thereby give an increased time delay to prevent operation of the control due to an artificial condition which may be created by a suspended load. On a "small-load" setting, switch 110 will remain operative when the sensing rings are switched out of the control circuit and the electronically timed cycle initiated. Switch 92 can also be closed to increase the available small load time delay still further. This small load time delay is desirable in dryer operation and particularly in machines having air capacity sufficient to float the load during operation. Accordingly, sufficient time delay may be provided in this instance in the form of capacitors 40, 87, 89 and 97, to accommodate any time during which the sensing rings are not bridged. It will also be noted that the "small-load" operation is provided without further complicating the circuit by utilizing the capacitors of the electronic timing circuit to effect the desired increase in time delay.

The control circuit described to this point provides a particularly desirable arrangement whereby a completely electronic control affords a direct moisture sensing cycle or a combination direct moisture sensing cycle and an electronic timed cycle. The circuit also lends itself particularly well to the provision of an "air-fluff" cycle, namely dryer operation wherein the dryer heater is de-energized but the motor is energized and utilizes the electronic timing circuit to control the duration of the "air-fluff" cycle. In this operation the electronic control has sole control over the dryer and it will be appreciated that with minor modifications the electric timer could be used to time other dryer operations if desired. More particularly, selection of an "air-fluff" cycle closes switch 54 on contact 96, closes switch 98 on contact 100, and momentarily closes switch 102 on contact 104 to complete a circuit through impulse relay 78. The impulse relay closes its switches, switch 86 is ineffective as it will have been disabled by movement of switch 54 to contact 96 but switch 106 closes on contact 108, switch 80 closes on contact 84 and switch 94 is momentarily closed to remove any residual charge left on the capacitors. This completes a circuit to the dryer motor and the electronic control and after the selection is made switch 102 returns to its open position thereby opening the circuit to the stepping relay but leaving it in an actuated state. It will be noted that switches 54, 106 and 98 permit energization of the dryer motor and electronic control without energizing machine relay 52, actually the circuit to machine relay 52 is disabled by moving switch 54 from contact 56. The operator will have selected the duration of the "air-fluff" cycle by having either left switch 92 open or having closed it to provide a longer cycle. After the selected time interval, the necessary charge will have accumulated on the capacitor, or capacitors, and the necessary potential will appear at junction 20 to break down neon lamp 26 and switch diode 28 to its "on" state. Relay 30 is energized and momentarily closes switch 55 on contact 59 to complete a circuit to impulse relay 78. The impulse relay steps to open switch 106 and moves switch 80 to contact 82 to shut down the dryer motor, de-energize the electronic control and return the dryer and electronic control to their normal positions from which they are ready for performance of another selected dryer cycle.

Although but one embodiment of the present invention has been illustrated and described, it will be apparent to those skilled in the art that various changes and modifications may be made therein without departing from the spirit of the invention or from the scope of the appended claims.

What we claim is:

1. In a dryer having a heater and motor the combination of:

machine relay means for controlling energization of said motor and heater, control means connected with and energized when said relay means is actuated to energize said motor and heater and operative, when energized, to in turn control said relay means, said control means including control switch means connected with and controlling the operational state of said relay means, means for sensing moisture content of articles in said dryer and operative, when connected with said control switch means, to control and actuate said control switch means in accordance with moisture content of said articles, electronic time delay means operative, when connected with said control switch means, to actuate said control switch means with a predetermined time delay after said electronic means is energized, and selector switch means for selectively connecting said moisture sensing means and electronic means with and for control of said control switch means, second control means connected for selective energization in accordance with the operational state of said control switch means and operative, in response to actuation of said control switch means by said moisture sensing means to de-energize said machine relay, to establish a circuit to re-energize said relay means, heater and motor and operate said selector switch means to connect said electronic means in circuit with said control switch means, and switch means in the circuit established by said second control means and operative selectively to open and complete said circuit to provide selection of either a first drying cycle controlled by said moisture sensing means and extended by said electronic means or a second drying cycle controlled by and having a period determined solely by said moisture sensing means.

2. The combination of claim 1 wherein said electronic time delay means comprises a plurality of capacitive means and switch means operative to selectively connect said capacitive means to said control switch means.

3. The combination of claim 1 wherein said electronic time delay means comprises a plurality of capacitive means and switch means connected in circuit with and operative to selectively connect said capacitive means in the circuit of said electronic time delay means so that the time delay available from said electronic means is adjustable.

4. The combination of claim 1 including means for providing a time delay in the actuation of said control switch means by said moisture sensing means and also including means for adjusting the duration of said time delay.

5. In a dryer having a heater and motor the combination of:

electrically actuated means for controlling energization of said motor and heater, control means connected with and energized when said electrically actuated means is operated to energize said motor and heater and operative, when operated, to in turn control said electrically actuated means, said control means including control switch means connected with and controlling the operational state of said electrically actuated means, means for sensing moisture content of articles in said dryer and operative, when connected with said control switch means, to control the operational state of said switch means in accordance with moisture content of said articles, electronic time delay means operative, when connected with said switch means, to change the operational state of said switch means with a predetermined time delay after said electronic means is energized, and selector switch means for selectively connecting said moisture sensing means and electronic means with and for control of said control switch means, second control means connected for selective energization in accordance with the operational state of said control switch means and operative, in response to actuation of said control switch means by said moisture sensing means to de-energize said electrically actuated means to establish a circuit to re-energize said electrically actuated means, heater, motor and electronic means, momentary switch means connected in circuit with and selectively operable to complete a circuit to said electrically actuated means, and switch means controlled by said electrically actuated means and operative to maintain a holding circuit for said electrically actuated means upon energization of said electrically actuated means.

6. The combination of claim 5 including switch means operative independently of said selector switch means to connect said electronic timing means in circuit with said moisture sensing means to provide a predetermined time delay in the actuation of said control switch means by said moisture sensing means.

7. In a dryer having a heater and motor the combination of:

machine relay means connected with and operative, when energized, to energize said motor and heater, control means connected with and energized when said relay means is energized and operative, when energized, to in turn control said relay means, said control means including control switch means connected with and operative when actuated to de-energize said relay means, means for sensing moisture content of articles being dried in said dryer and operative, when connected with said control switch means, to actuate said control switch means in accordance with a predetermined moisture content of said articles, electronic timing means operative, when connected with said control switch means, to actuate said control switch means with a predetermined time delay after said electronic means is energized, and selector switch means for selectively connecting said moisture sensing means and electronic means with and for control of said control switch means, second control means connected for selective energization when said control switch means is actuated and operative, in response to actuation of said control switch means by said moisture sensing means to de-energize said relay means, to set-up a circuit to said relay means, means including momentary switch means in the circuit set-up by second control means and operative to momentarily hold a circuit to said relay means closed and open the circuit to said relay means after a predetermined time delay and also including means for maintaining said momentary switch means open during subsequent dryer operation so that said momentary switch means completes a momentary circuit to said relay means, and holding switch means operative, when said relay means is energized by said normally closed switch means, to establish a holding circuit for said relay means.

8. The combination of claim 7 wherein said selector switch means normally connects said sensing means with said control switch means and is connected to and controlled by said second control means for actuation, when said second control means is energized to set-up a circuit to said relay means, to disconnect said sensing means from and connect said electronic timing means to said control switch means.

9. The combination of claim 8 wherein said control switch means is actuated in response to a predetermined voltage and wherein said electronic timing means includes capacitive means connected in circuit with said control switch means to afford a predetermined timed response of said control switch means to said electronic timing means.

10. In a dryer having a heater and motor the combination of:

a machine relay, momentary switch means connected in circuit with and selectively operable to connect said relay to an electrical source for energization thereof, switch means controlled by said relay and operative, when said relay is energized, to energize said heater and motor and to establish a holding circuit for said relay, control means connected with and energized when said relay is energized, said control means including control switch means connected with and operative, when actuated, to de-energize said relay, means for sensing moisture content of articles being dried in said dryer and operative, when connected with said control switch means, to actuate said control switch means in response to a predetermined moisture content of said articles, electronic timing means operative, when connected with said control switch means, to actuate said control switch means with a predetermined time delay after said timing means is activated, and selector switch means normally connecting said sensing means to control said control switch means and selectively operable to disconnect said sensing means from and connect said timing means to said control switch means, second control means connected for selective energization when said control switch means is actuated by said moisture sensing means and operative, in response to actuation of said control switch means to de-energize said relay, to set-up a circuit to said relay and also connected with said selector switch means to disconnect said sensing means from and connect said timing means to said control switch means when said control switch means is actuated to de-energize said relay, and switch means in the circuit set-up by said second control means and characterized by completing a momentary circuit to said relay and being opened after said relay means is energized.

11. The combination of claim 10 wherein said second control means is electrically energized.

and also including switch means in circuit with said second control means for selectively completing and opening the circuit to said second control means so that dryer operation on the basis of moisture sensing can be provided alone or followed by a dryer cycle controlled by said timing means.

12. The combination of claim 10 wherein said timing means comprises an RC network.

13. The combination of claim 12 wherein said moisture sensing means includes a sensing member connected to receive an electrical charge and arranged for engagement by said articles to have said charge diminished in accordance with the moisture content of said articles, and resistance means connected with said sensing means and adjustable to control the charge impressed thereon, said resistance means also connected to cooperate in said RC network.

14. The combination of claim 10 wherein said electronic timing means includes capacitive means, and including switch means operative independently of said selector switch means to connect the capacitive means of said electronic timing in circuit with said mosture sensing means to provide a predetermined time delay in the response of said control switch means to said moisture sensing means.

15. In a dryer having a heater and motor the combination of, a machine relay, momentary switch means connected in circuit with and selectively operable to connect said relay to an electrical source for energization thereof, switch means controlled by said relay and operative, when said relay is energized, to energize said heater and motor and to establish a holding circuit for said relay, control means comprising control relay means including first switch means in circuit with said machine relay and having a first position setting up a circuit to said machine relay and movable, in response to actuation of said control relay means, to a second position opening the set-up circuit to said machine relay, control switch means for controlling actuation of said control relay means, means for sensing moisture content of articles being dried in said dryer and operative, when connected with said control switch means, to actuate said control switch means in response to a predetermined moisture content of said articles, electronic timing means operative, when connected with said control switch means, to actuate said control switch means with a predetermined time delay after said timing means is activated, and selector switch means normally connecting said sensing means to control said control switch means and selectively operable to disconnect said sensing means from and connect said timing means to said control switch means, second control means connected for selective energization when said control switch means is actuated and operative, in response to actuation of said control switch means to de-energize said machine relay, to set-up a circuit to said machine relay, and also connected with said selector switch means to disconnect said sensing means from and connect said timing means to said control switch means when said control switch means is actuated to de-energize said machine relay, and normally open switch means in the circuit set-up by said second control means and including means operative when said circuit is set-up to said second control means to close said normally open switch means to energize said machine relay, said normally open switch means so arranged in circuit with said machine relay as to be by-passed when said holding circuit is established so that said normally open switch means is allowed to re-open.

16. The combination of claim 15 wherein said second control means is electrically energized and is connected in circuit with said first switch means to have a circuit set-up thereto by said first switch means when it is moved to its second position, and also including switch means in circuit with said second control means for selectively completing and opening the circuit to said second control means so that dryer operation on the basis of moisture sensing can be provided alone or followed by a dryer cycle controlled by said timing means.

17. The combination of claim 16 wherein said timing means comprises an RC network including a plurality of capacitive means and means for selectively connecting said capacitive means in said RC network to adjust said predetermined time delay.

18. The combination of claim 17 wherein said moisture sensing means includes a sensing member connected to receive an electrical charge and arranged for engagement by said articles to have said charge diminished in accordance with the moisture content of said articles, and resistance means connected with said sensing means and adjustable to control the charge impressed thereon, said resistance means also connected to cooperate in said RC network.

19. The combination of claim 16 including, first selectively operable switch means connected in circuit with said momentary switch means, said normally closed switch and said second control means and having a first position setting up a first circuit to said machine relay through said momentary and normally closed switch means and a second position opening said first circuit and setting up a circuit to said second control means, second selectively operable switch means in circuit with said control means and said machine relay controlled switch means and having a first position setting up a circuit to said control means through said machine relay switch means and a second position setting up a circuit to said control means independently of said machine relay switch means, momentary switch means for completing a circuit through said second control means, said second control means also including switch means operative, when said second control means is energized, to complete a circuit to said dryer motor and to said control means through said second selectively operable switch means.

20. The combination of claim 19 wherein said second control means comprises an impulse relay operative to alternately open and close its respective switches in response to energization thereby and to hold said switches open and closed when actuated.

21. The combination of claim 15 wherein said second control means comprises an impulse relay operative to alternately open and close its respective switches in response to energization thereof and to hold said switches open and closed when actuated.

22. The combination of claim 21 wherein said electronic timing means comprises capacitive means and also includes momentary switch means connected with said impulse relay and said capacitive means to connect said capacitive means to ground when said impulse relay connects said timing means to said control switch.

23. The combination of claim 17 including switch means operative independently of said selector switch means to connect the capacitive means of said timing means in circuit with said moisture sensing means to provide a predetermined time delay in the response of said control switch means to said moisture sensing means.

24. The combination of claim 23 wherein said switch means in circuit with said second control means and said independently operable switch means for connecting said capacitive means in circuit with said moisture sensing means are connected for selective operation with said momentary switch means.

References Cited by the Examiner

UNITED STATES PATENTS 3,197,884 8/1965 Smith ---------------- 34—45

FREDERICK L. MATTESON, Jr., *Primary Examiner.*

JOHN J. CAMBY, *Examiner.*